United States Patent [19]

Weber et al.

[11] Patent Number: 5,506,988
[45] Date of Patent: Apr. 9, 1996

[54] PROGRAM-CONTROLLED COMMUNICATION INSTALLATION

[75] Inventors: Dietmar Weber; Wolfgang Hubig, both of Munich, Germany

[73] Assignee: Siemens Aktiengesellschaft, Munich, Germany

[21] Appl. No.: 292,297

[22] Filed: Aug. 16, 1994

Related U.S. Application Data

[63] Continuation of Ser. No. 133,768, Oct. 7, 1993, abandoned, which is a continuation of Ser. No. 720,711, Jun. 25, 1991, abandoned.

[30] Foreign Application Priority Data

Jun. 26, 1990 [EP] European Pat. Off. ............ 90112139

[51] Int. Cl.$^6$ .................................................. H04M 17/02
[52] U.S. Cl. ...................... 395/650; 364/221; 364/221.5; 364/706; 379/146; 370/58.2; 370/60
[58] Field of Search ...................................... 364/200, 900; 370/58.2, 58.5; 395/650

[56] References Cited

U.S. PATENT DOCUMENTS

| | | | |
|---|---|---|---|
| 4,152,761 | 5/1979 | Louie | 364/200 |
| 4,589,093 | 5/1986 | Ippolito et al. | 364/900 |
| 4,612,418 | 9/1986 | Takeda et al. | 179/81 R |
| 4,642,756 | 2/1987 | Sherrod | 364/200 |
| 4,658,351 | 4/1987 | Teng | 364/200 |
| 4,720,850 | 1/1988 | Oberlander et al. | 379/90 |
| 4,723,237 | 2/1988 | Andrew et al. | 370/11 |
| 4,769,771 | 9/1988 | Lippmann et al. | 364/200 |
| 4,903,258 | 2/1990 | Kuhlmann et al. | 370/58.2 |
| 4,905,237 | 2/1990 | Voelzke | 370/110.1 |
| 4,908,824 | 3/1990 | Leibe et al. | 370/85.15 |
| 4,993,017 | 2/1991 | Bachinger et al. | 370/58.2 |
| 5,012,409 | 4/1991 | Fletcher et al. | 364/200 |
| 5,014,306 | 5/1991 | Rodgers et al. | 379/407 |
| 5,018,097 | 5/1991 | Kuhlmann et al. | 364/900 |
| 5,023,776 | 6/1991 | Gregor | 364/200 |
| 5,047,923 | 9/1991 | Elstner et al. | 364/200 |
| 5,068,778 | 11/1991 | Kosem et al. | 364/138 |
| 5,150,357 | 9/1992 | Hopner et al. | 370/68.1 |
| 5,339,425 | 8/1994 | Vanderah et al. | 395/700 |

FOREIGN PATENT DOCUMENTS

| | | |
|---|---|---|
| 0303870 | 2/1989 | European Pat. Off. . |
| 0333123 | 9/1989 | European Pat. Off. . |

OTHER PUBLICATIONS

"System X: The Processor Utility" by Troughton et al, British Telecommunications Engineering, vol. 3, Jan. 1985, pp. 226–240.

"Emert Operating System" by Grzelakowski et al, American Telephone & Telegraph Company, The Bell System Technical Journal vol. 62, No. 1, Jan. 1983, pp. 303–322.

(List continued on next page.)

*Primary Examiner*—Kevin A. Kriess
*Assistant Examiner*—Majid A. Banankhah
*Attorney, Agent, or Firm*—Hill, Steadman & Simpson

[57] ABSTRACT

A program-controlled communication installation is composed of at least a digital computer system having a computer core (processor) administered by a multi-tasking operating system and having a system memory wherein a plurality of program modules are stored. Each of the program modules serves the purpose of realizing a defined function of the communication installation. A function can only be executed in that the appertaining program module is handled by the computer core. Since a plurality of functions usually pend for execution, the executable program modules are noted in a process list from which the operating system respectively selects the program module having the highest priority and allocates it to the computer core for execution. In order to prevent a long duration displacement of program modules having lower priority, the program modules are combined into groups as program module function classes, each of which is respectively successively interpreted as being current for a certain chronological duration in periodic succession, whereby the operating system only takes those program modules that belong to the respectively current program module function class into consideration in the selection from the process list.

15 Claims, 5 Drawing Sheets

OTHER PUBLICATIONS

"Software Fur Eine Digitale Vermittlungsanlage Mit Modularem Aufbau" by H. Kieser, Nachrichten Technik Elektronik, vol. 35, No. 2, 1985 pp. 45–47.

"ISDN as the Key to Increased User Benefits in the Office" by Peter Pribilla, Technology & Applications of the HICOM ISDN Communication System, Special Issue Telcom Report & Siemens Magazine COM, Dec. 1985, pp. 13–103.

PROGRAM-CONTROLLED COMMUNICATION INSTALLATION

This is a continuation of application Ser. No. 133,768, filed Oct. 7, 1993 which is a continuation of application Ser. No. 720,711, filed Jun. 25, 1991, now abandoned.

BACKGROUND OF THE INVENTION

The present invention is directed to a program-controlled communication system.

In communication network systems, such program-controlled communication systems which are also called program-controlled communication serve for the connection of terminal equipment to one another and for connecting these terminal equipment to communication networks, particularly public networks.

The multiplicity of known communication systems extends from simple telephone systems for the exclusive transmission of voice up to the fully expanded ISDN (integrated services digital network) communication systems having simultaneous multiple or mixed voice, text, picture and data communication. Terminal equipment having a great variety of performance features can be connected to the communication installation in an ISDN communication system, ranging from analog and digital telephones, telecopiers, multifunctional terminals, work station systems, personal computers, teletex and picture screen text stations up to data terminals. Such a communication installation is disclosed in a special edition of "Telcom Report", ISDN in the office, 1985, ISBN 3-8009-3849-9, Siemens AG.

The communication installation on which these communication systems are based is modularly constructed and essentially represents a digital computer system having a plurality of periphery units.

For the implementation of special services and jobs, modular units (servers) are provided within the framework of what is referred to as a server concept, these modular units assuming these special jobs with their own "intelligence". With an operations and data server, for example, performance features for an electronic data book, for functions for data acquisition, data processing and data transport as well as for the implementation of control jobs of connected computers are thus made available. A voice information server offers the connected subscribers the further possibility of rerouting their telephone connection to personal voice mailboxes. A text and fax server offers, among other features, performance features that implement a conversion of teletex to telefax when telefax-capable terminal equipment is not present at the receiver.

Each of these servers is fundamentally an autonomous computer system that is connected both in terms of software, as well as, hardware to a computer-controlled line switching unit of the communication installation. The terminal equipment are connected to the line switching unit that forms the basic module of the communication installation.

The program-oriented part of the communication installation, generally referred to as the software, is also divided into operations, administration and reliability modules in terms of job or, respectively, function orientation. A respective plurality of function-related program modules whose handling is coordinated in an operating system as tasks (processes) belongs to each of these modules in the line switching unit as well as in the servers. Since reactions within a prescribed time are frequently required in a communication installation, a real time operating system is used as an operating system, enabling a high reaction capability and providing a priority-controlled handling of program modules.

In order to assure, on the one hand, that incoming information is processed within a prescribed chronological duration, a correspondingly high priority level must be assigned to the program module provided for processing this incoming information. However, on the other hand program modules with lower priority levels should not be placed into a waiting condition for too long a time period by program modules having higher priority and should be handled at least within a greater time span.

For these reasons, in the prior art involved test phases have always been required for assigning the priority levels. In many instances, it only becomes clear during such test phases that the desired chronological behavior of the communication installation cannot be achieved with the program modules that have been provided, so that the program code of various program modules must still be altered after the fact, i.e. after the conclusion of the development phase of a communication installation.

SUMMARY OF THE INVENTION

It is an object of the present invention in a program-controlled communication installation to assure a handling of program modules within a respectively prescribable chronological duration.

The program-controlled communication installation has at least one line switching unit to which devices and networks are connected via periphery modules, and the switching unit also has a switching matrix network. The installation also has a programmable digital computer system that processes incoming information according to respective priorities in the form of processing rules deposited in program modules and outputs resultant output information, the computer system having a system memory for storing data and the program modules, and the computer system having at least one computer core to which the program modules are allocated under the control of a multi-tasking operating system. The computer system has an activation identification sub-system, that notes the program modules provided for a processing of incoming information as being executable in a process list, the computer system having a process communication sub-system that notes program modules requested by the respectively active program module as being executable, and the computer system having a computer core allocation sub-system, that, dependent on priority values individually allocated to the program modules, selects a respective program module from the process list and assigns it to the computer core for execution.

The installation thereby comprises the program modules, oriented in terms of function complex, respectively allocated to a program module function class, and a computer core allocation sub-system, for the purpose of a prescribable or predetermined distribution of the processing capacity of the computer core related to function complexes, respectively successively selecting one of the program module function classes as the current program module function class in a prescribable predetermined sequence, and for a prescribable predetermined chronological duration and takes only those program modules that have an allocation to the respectively current program module function class into consideration in the selection of executable program modules.

Each of the program modules generally serves the purpose of recognizing a defined function of the communication installation. What is understood as function is thereby decisively dependent on the observation level within the structure of the communication installation. In a lower level, one function is realized by exactly one program module. Seen from an observation level that is arranged hierarchically higher, however, a plurality of program modules (each of which can respectively realize individual functions) can be responsible for the formation of, so to speak, a higher-ranking function, i.e. of a function complex. The program modules participating in the realization of such a function complex are combined to form a group that is referred to as program module function class.

In an inventively fashioned communication installation, the operating system comprises, so to speak, mixed behavior. With respect to the program module function classes, the behavior of the operating system essentially corresponds to that of a time-sharing operating system that generally makes the core of the computer available to a respective process only for the duration of a time slice.

As a result of the processing of the program modules within the program module function classes, the priority-controlled and, usually, event-controlled behavior of a traditional multi-tasking operating system is preserved. What thereby derives as a significant advantage is that the traditional priority control can be bypassed, so that program modules having lower priority have the core of the computer assigned to them independently of the presence of the program modules with higher priority, at least at certain time intervals. To that end, the appertaining program modules having lower priority are combined in a program module function class to which the core of the computer is assigned with a certain repetition rate and for a respective chronological duration for the traditional priority-controlled processing of its program modules.

The repetition rate and the chronological duration define that part of the computer capacity of the core of the computer that is assigned to a respective program module function class. This part is usually dimensioned such that it is just adequate to be able to assure the processing of the appertaining program modules within a chronological duration which must not be exceeded in the communication network system.

A further critical advantage is that an addition of program modules for the implementation of additional services is possible in an existing communication installation without reallocating the priority values of all program modules. The added program modules in such cases are assigned to a newly inserted program module function class. A reallocation of priority levels is thus required only among the added program modules.

An adaptation of the communication installation to modified real time demands is possible at any time on the basis of a redistribution of the computer capacity to the existing and, under certain circumstances, newly formed program module function classes.

It can be advantageous from operating system points of view, particularly in view of the structures of an already existing operating system, to provide an individual process list for every program module function class instead of a single process list in which all executable program modules of all program module function classes are noted, only the program modules allocated to the appertaining program module function class being noted in the individual process list. The individual process list belonging to the respectively current program module function class is then valid as a process list in the traditional sense.

For those cases wherein no executable program module allocated to the current program module function class is present or, respectively, the class-associated process list belonging to the current program module function class contains no notations, a change of the current program module function class can occur immediately, i.e. even before the expiration of the chronological duration provided for handling the appertaining program module function class. A certain flexibility in the distribution of the processing capacity of the core of the computer onto the existing program module function classes is thus achieved. A waste of computer capacity is thereby avoided.

For processing information under real-time conditions, a timer program module is provided in traditional multi-tasking operating systems, This timer program module usually has the highest priority level and is immediately executable on the basis of information related to real time, for example on the basis of a periodic timing clock. The timer program module monitors the passing of time and can thus chronologically synchronize the processing of other program modules. For example, it declares a program module to be executable only when a defined plurality of timing clocks has arrived.

In an advantageous development of the present invention, this time program module is not allocated to any program module function class in order to enable an immediate processing of the timer program module after the arrival of the real-time-related information. To that end, the executability of the timer program module is interrogated by the computer core allocation sub-system immediately after every change of the current program module function class. When it is executable, i.e. when real-time-related information has arrived, the processing of the timer program module is immediately initiated.

Another advantageous development of the present invention relates to the floating or idling program module that is always executable in traditional multi-tasking operating systems and that is provided with the lowest priority level. It can be advantageous to avoid an allocation of this idling program module to a program module function class when a handling of the idling program module should only occur when no executable program module can be found in the entire operating system.

The distribution of the processing capacity of the computer core to the various program module function classes is defined by the repetition rate and by the chronological duration, that is, how frequently or, respectively, how long the computer core is accessible to a respective program module function class. Without anticipated limitations, the chronological duration can be uniformly selected for all program module function classes and can be prescribed by a periodically repeating timing information, for example a timing clock having a period duration of 20 ms.

The repetition rate is defined by a sequence table wherein the program module function classes are recited in the sense of a cyclically repeating sequence. The distribution of the computer capacity can thereby be extremely flexibly and simply fashioned.

The employment of an inventively fashioned communication installation proves particularly advantageous in an ISDN communication system modularly structured in the form of a server concept. As already mentioned, the "intelligent units" referred to as servers in the known communication installation are autonomous computer systems that are specialized for handling specific services or jobs within the ISDN communication system. In an inventively fashioned communication installation, the program-oriented components of the servers can be combined on a common computer system having a single computer core. A higher-performance processor is usually required as a common computer core to provide a processing capacity to be achieved that at least corresponds to the sum of the processing capacity of the processors present in the individual servers. The program modules that have their priority classification left unaltered in each and every server are each respectively allocated to a separate program module function class. By dimensioning the repetition rate and the chronological duration, the program modules of a server allocated to a respective program module function class receive a part of the processing capacity of the higher-capacity, common processor that corresponds to the processing capacity of the processor present in the previous server.

The use of the inventively fashioned communication installation proves especially advantageous when the operating system on which the communication installation is based (usually designed for multi-tasking operation) is to be supplemented by a time-sharing operating system, for example UNIX. Such a time-sharing operating system, in addition to offering the users of the communication installation the existing services of the communication installation, also offers the users the possibility of individually preparing and processing personal as well as switching-oriented data and programs.

European Patent Application E-A-0 333 123, corresponding to U.S. Pat. No. 4,993,017 discloses a modularly structured ISDN communication system wherein a transition program module in the appertaining multi-tasking operating system of the communication installation is fashioned as a sluice in which a change is undertaken from the existing multi-tasking operating system to the added time-sharing operating system. The transition program module has the lowest priority level allocated to it, so that how often and how long the time-sharing operating system is available to the users was previously dependent on the workload of the communication installation. Definite statements could therefore not be made regarding processing times in the time-sharing operation.

With the inventively fashioned communication installation, the existing software for the change in operating system can be accepted unaltered, whereby the transition program module is merely assigned by itself to a separate program module function class. Due to the sequence and the chronological duration in the allocation of the program module function classes, an arbitrary part of the processing capacity of the computer core can be assigned to the time-sharing operating system. As a result a certain processing capacity can be guaranteed in the time-sharing operating system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

To understand the exemplary embodiment, a description will be set forth first of the prior art communication system cited above.

Figure 1:
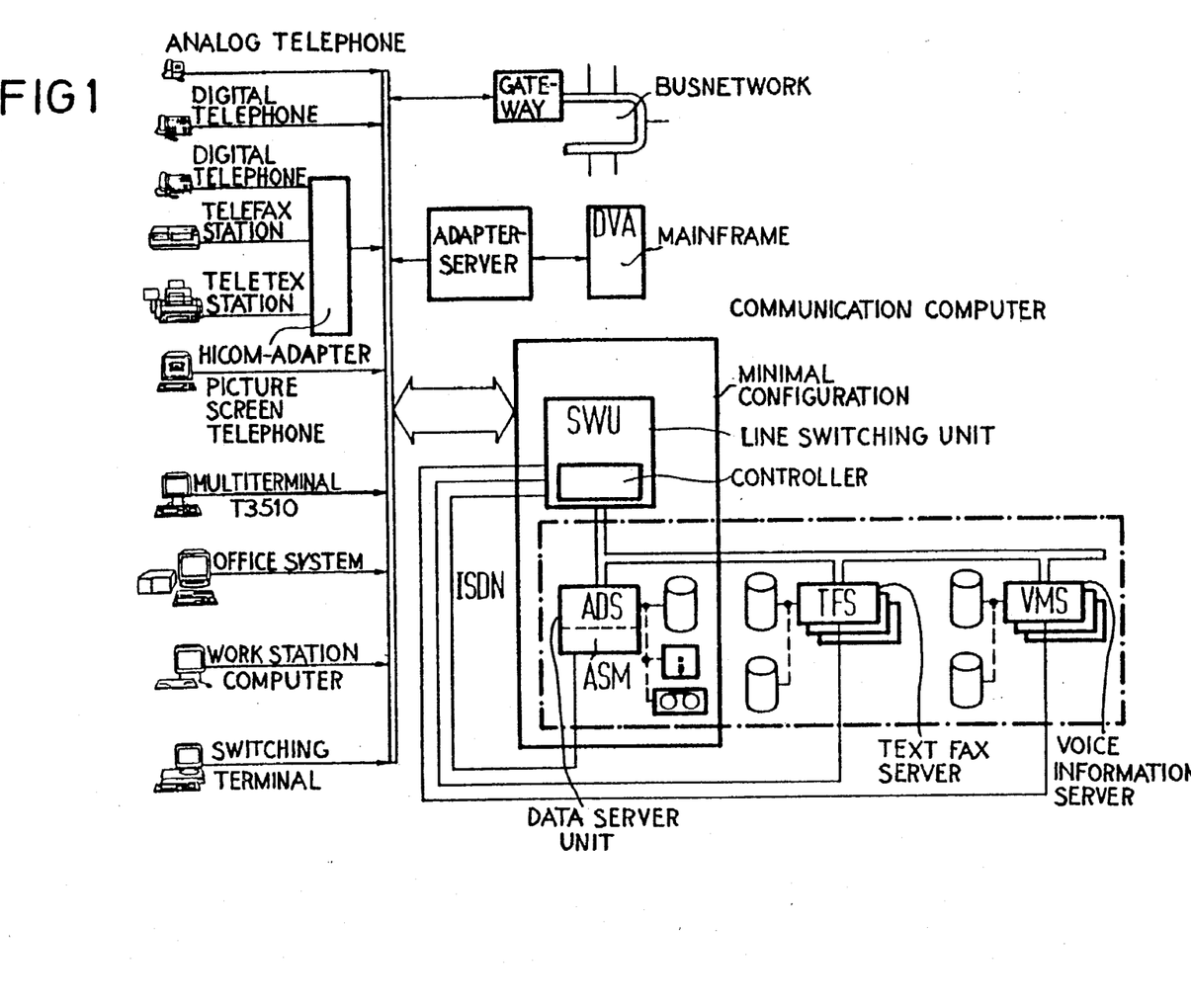
FIG. 1 is a schematic block illustration of a known ISDN communication computer in combination with periphery units.

FIG. 1 schematically depicts a known communication computer together with a plurality of connectable communication equipment. The critical component parts of the communication computer are a line switching unit SWU and an operations data server unit ADS. These two units are supplemented by a text fax server unit TFS and by a voice information server unit VMS. In addition, the operations data server unit ADS can have an application module that is provided with a time-sharing operating system.

The units SWU, ADS, TFS, VMS are fashioned as autonomous processing units and are provided with their own processors. Compared to the line switching unit SWU which essentially only links information paths, the operating data server unit ADS represents a system unit that is additionally assigned with the organization and control of the overall communication system.

The functions implemented for this purpose in the operating data server unit ADS can be subdivided into a function complex related to system operations and into various, optional data application functions. Included, for example, among the functions related to the system operations is the initialization of the installation, the loading of system programs, the distribution and starting of these system programs, the activation or, respectively, deactivation of system functions, as well as the acquisition of all operational changes.

A number of program modules are kept ready for the execution of these functions, and are supplied as needed to the computer core (processor) in the operations data server unit ADS or, respectively, in the line switching unit SWU for handling.

Since as a rule a plurality of functions can simultaneously pend for execution, a program that ranks respectively higher than the program modules, namely what is referred to as an operating system, sees to an administration of the appertaining computer core both in the line switching unit SWU as well as in the operations data server unit ADS. The operating systems are coupled to one another via a system bus. Since short reaction times are generally required, both operating systems must be fashioned as real time operating systems. The installed operating systems are called multi-tasking operating systems since the program modules are referred to as tasks when they are handled in the sense of their job-associated allocation. The program modules are software units composed of program code and data that are intended to satisfy specific functions when they are handled and are thus intended to enable a structured formatting of a system. Every program module has what is referred to as a priority value assigned to it. This expresses the importance of the function executed by the program module and is decisive in the competition with other tasks for the allocation of the computer core.

In an operating system provided for real time processing, the program modules for time-critical functions are provided with correspondingly high priority values in order, as needed, to obtain an optimally immediate allocation of the computer core.

On the basis of this known communication computer and the function units thereof, a communication installation provided with the present invention is set forth in greater detail below.

Figure 2:
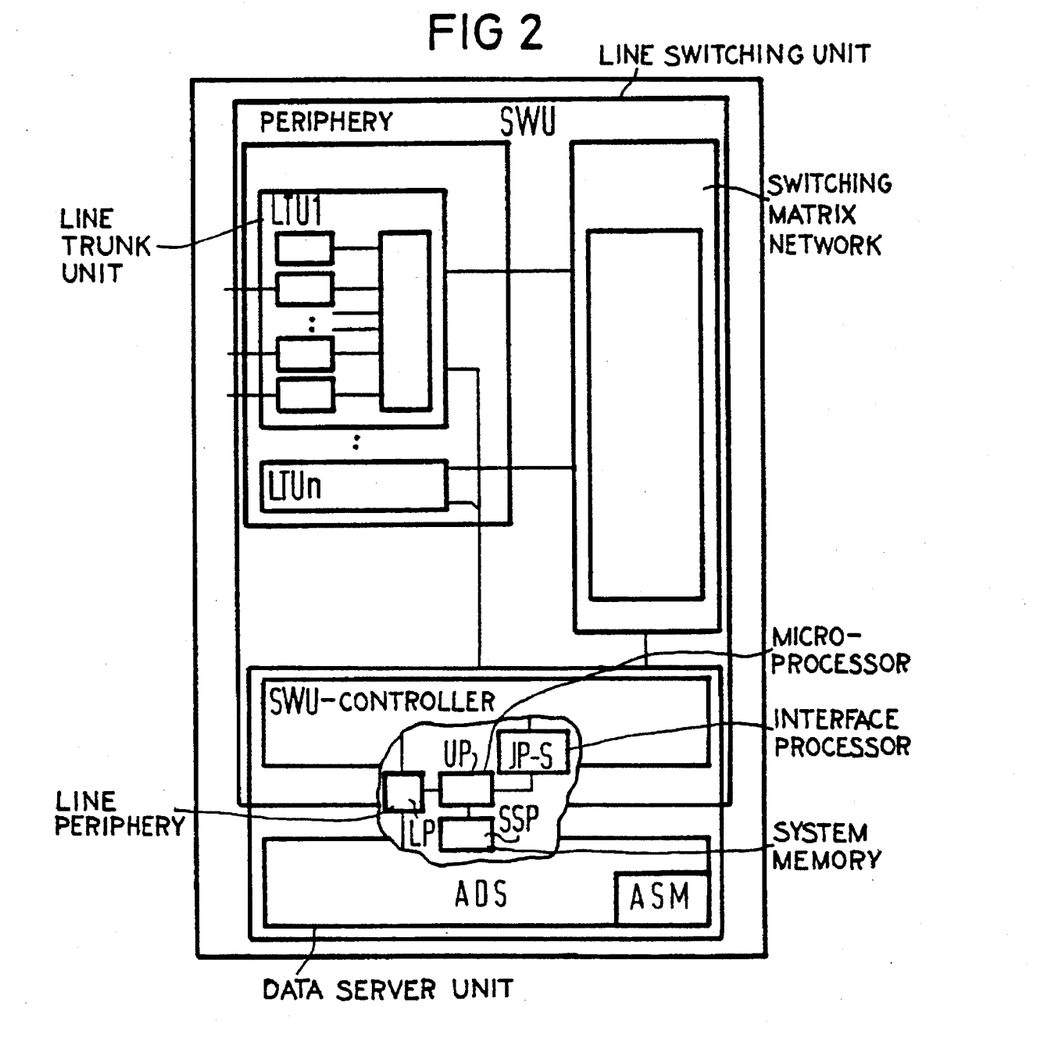
FIG. 2 is a schematic block circuit diagram having the critical hardware components of an inventively fashioned communication installation.

To that end, the function components of the line switching unit SWU and of the operations data server unit ADS in a communication installation containing the present invention are shown in FIG. 2 with reference to a block circuit diagram. As may be seen, the line switching unit SWU is composed of three sub-units, namely of a periphery unit having a plurality of line trunk units LTU . . . LTUn, a switching matrix network and a SWU controller. A microprocessor µP, a system memory SSP, an interface processor IPS as well as a line periphery LP are individual hardware components of the SWU controller.

These hardware components are also available to the operations data server unit ADS, so that the SWU controller and the operations data server unit represent in fact different function units but have a common hardware available to them. Consequently, only one operating system is also present that coordinates the program modules of both the operations data server unit ADS as well as those of the SWU controller and allocates them to the common microprocessor µP (computer core) for handling.

Figures 3, 4:
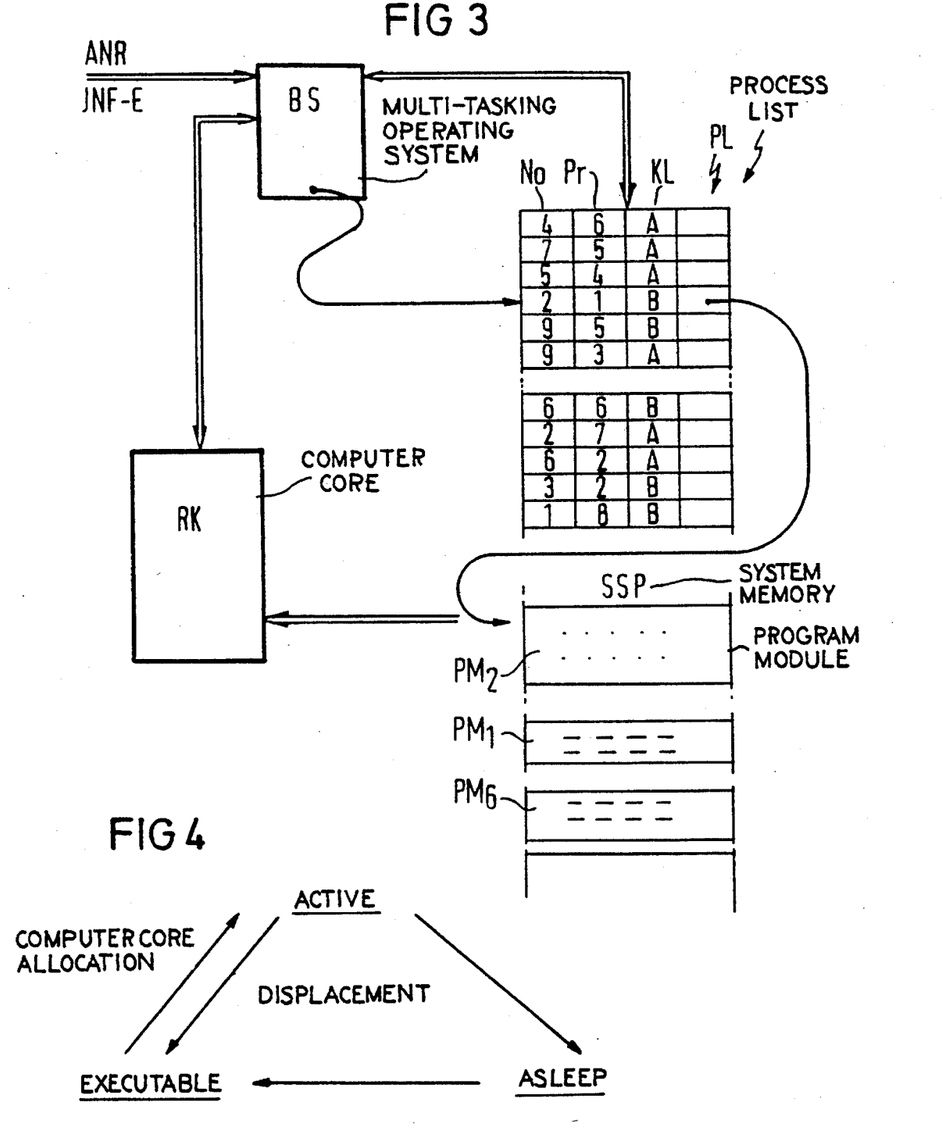
FIG. 3 is a schematic block illustration for illustrating the allocation of program modules via a process list.
FIG. 4 is a simplifying, graphic illustration for illustrating the status transitions in a multi-tasking operating system.

With reference to schematic function blocks, FIG. 3 shows the interaction of the process list PL and of the program modules PM in a multi-tasking operating system BS having a computer core RK.

As viewed in terms of its principle, the computer core RK serves exclusively for processing the program referred to as operating system BS. This program, however, is designed such that, dependent on incoming information INF-E, for example interrupts, as well as on internal conditions, it respectively selects one of the program modules PM available to it in succession and assigns it for a certain chronological duration to the computer core RK for execution. Every program module PM is deposited as a program code sequence in the system memory SSP and has a name NO, for example, an identification number, as well as a priority value PR. However, according to the present invention, every program module PM has a program module function class allocation whose significance shall not be discussed in greater detail for the moment.

The operating system BS has a process list PL available in which it notes the executable program modules, for example by entering the name NO, the priority value PR, the class allocation KL and the address ADR of the program module in the system memory SSP, and from which it then identifies the respective program module PM having the highest priority for an allocation to the computer core RK.

When the computer core RK is allocated to a program module, the appertaining program module can keep the computer core RK either until a program module having higher priority asks for allocation of the computer core RK or until it releases the computer core RK on its own. The latter is also particularly true when a program module requires information to be produced by other program modules in order to process its jobs and must wait for the arrival of such information.

As the status graph shown in FIG. 4 depicts, every program module of the operating system is in precisely one of essentially three statuses at an arbitrary time, these being referred to as active, executable and asleep. The program module to which the computer core is currently allocated is therefore active. All program modules that compete for allocation of the computer core are executable and the program modules that are waiting for the arrival of specific events or messages are asleep.

Figure 5:
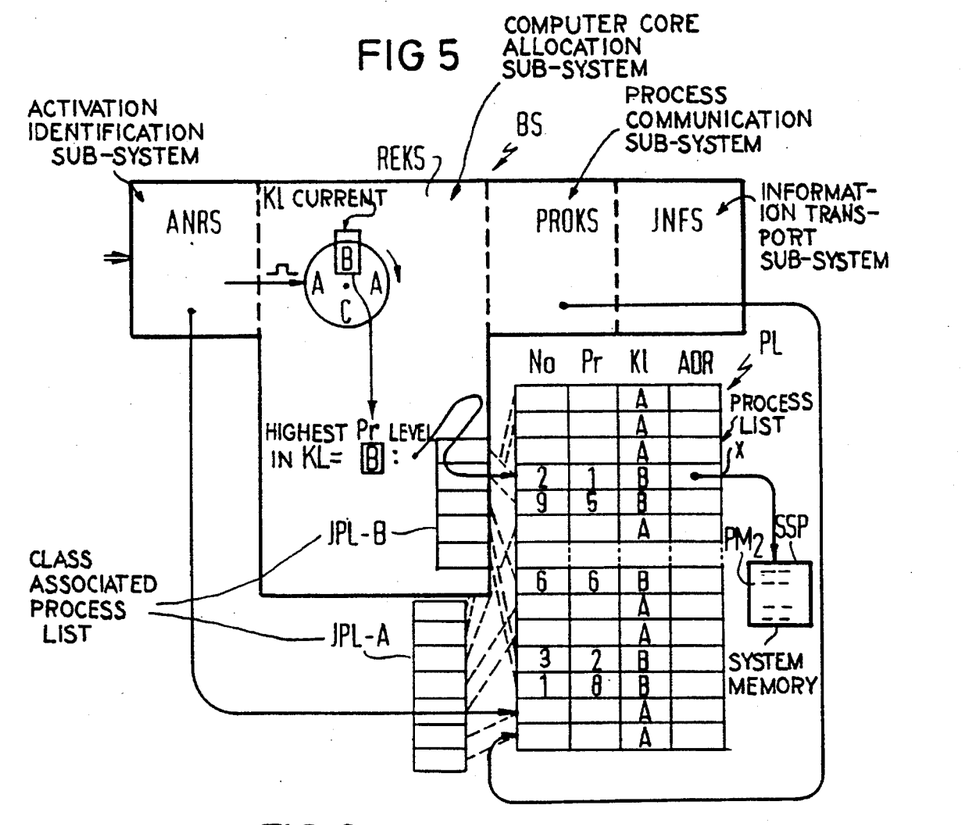
FIG. 5 is a schematic block illustration for illustrating the functions of the computer core allocation sub-system.

The program part in the operating system that is responsible for the selection and allocation of a program module for the computer core is referred to as a computer core allocation sub-system REKS or is also referred to as a task scheduler. As shown in FIG. 5 with reference to a block diagram, an activation identification sub-system ANRS as well as a process communication sub-system PROKS and an information transport sub-system INFS are further critical program parts of the operating system.

The selection of the next program module to be allocated to the computer core occurs with the assistance of the aforementioned process list PL in which the activation identification sub-system ANRS notes executable program modules by entering at least their identification number NO. As a rule, this occurs upon arrival of an information, for example of an interrupt or, respectively, of an activation ANR that initiates the processing of an appertaining program module.

The process communication sub-system PROKS serves the purpose of being able to forward jobs from the momentarily ongoing program module to other program modules that, in such cases, are noted as executable in the process list PL by the process communication sub-system PROKS. Data can be exchanged between the program modules with the assistance of the information transport sub-system INFS, for example when an active program module requests a different program module and would like to supply this program module with input data or, respectively, subsequently awaits output data from it.

As was already indicated in conjunction with FIG. 3, the program modules are respectively assigned to a program module function class KL, whereby the program modules of each and every program module function class KL respectively relate to a common function or, respectively, job complex of the communication installation. For example, the switching technology, the call data acquisition, the data and message transport or the organizational jobs of the communication system can be cited as examples of such function or, respectively, job complexes.

In the present exemplary embodiment, however, it shall be, first, the SWU controller, second, the operations data server unit ADS and, further, the functions of the time-sharing operating system that can be transferred in with a transition program module that are interpreted as function complexes. In the present exemplary embodiment, the transition program module corresponds to the idling program module in traditional multi-tasking operating systems.

With the allocation that has been undertaken, the program modules of the SWU controller are allocated to a first program module function class A, those of the operations data server unit ADS are allocated to a second program module function class B and the transition program module is allocated to a third program module function class C.

The program modules that sequence on two separate processors and operating systems in the known ISDN communication installation (the reference is cited above in the specification) can be used for the implementation of the functions of the SWU controller and of the operations data server unit ADS. The priority values that are respectively allocated to the program modules and respectively finally tuned to one another to satisfy the real time demands can remain unaltered.

The computer core allocation sub-system REKS uses the allocation of the program modules into program module function classes KL for the purpose of respectively taking only those program modules into consideration in the selection of executable program modules from the process list PL that belong to a current program module function class KL at a respective time. The program modules noted in the process list PL that do not belong to the current program module function class are not shown in FIG. 5. As an alternative to a single process list wherein the program modules PM of all program module function classes are noted, class-associated process lists JPL-A, JPL-B can also be provided as indicated.

Which of the three program module function classes KL is the current one at a respective time changes every 20 ms with a periodic timing clock (timer interrupt). Using a sequence table AT wherein the sequence regarding which of the program module function classes KL is to become respectively current next is noted, the computer core allocation sub-system REKS identifies the next, current program function class KL upon arrival of the periodic timing clock.

Differences with respect to traditional multi-tasking operating systems thus essentially only affect the computer core allocation sub-system REKS. Since the idling program module is always executable, no notations in the process list are required with respect thereto. As soon as the third program module function class C is current, the idling program module becomes active and, thus, the time-sharing operating system becomes active.

Figure 6:
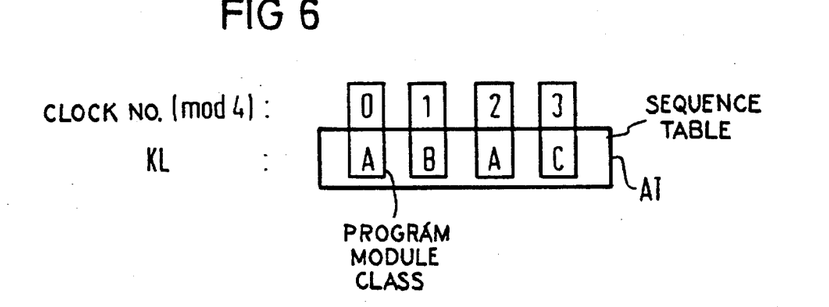
FIG. 6 is an illustration of a sequence table.

FIG. 6 shows an example of a sequence table AT. The first program module class A in this sequence table AT becomes current at every second periodic timing clock and the second and third program module function classes B and C respectively become current at every fourth periodic timing clock. Accordingly, 50% of the processing capacity of the computer core is allocated to the SWU controller and respectively 25% thereof is allocated to the operations data server unit ADS and to the time-sharing operating system.

Between two periodic timing clocks, the computer core allocation sub-system REKS only considers those program modules that belong to the respectively current program function class KL and are noted as being executable. The priority values of the program modules are thus of significance only within one and the same program module function class KL. When, for example, a program module sends a message to a program module having higher priority and when the latter becomes executable as a result thereof, then the program module having higher priority obtains the computer core immediately only when both program modules are classified in the same program module function class KL.

Figure 7:
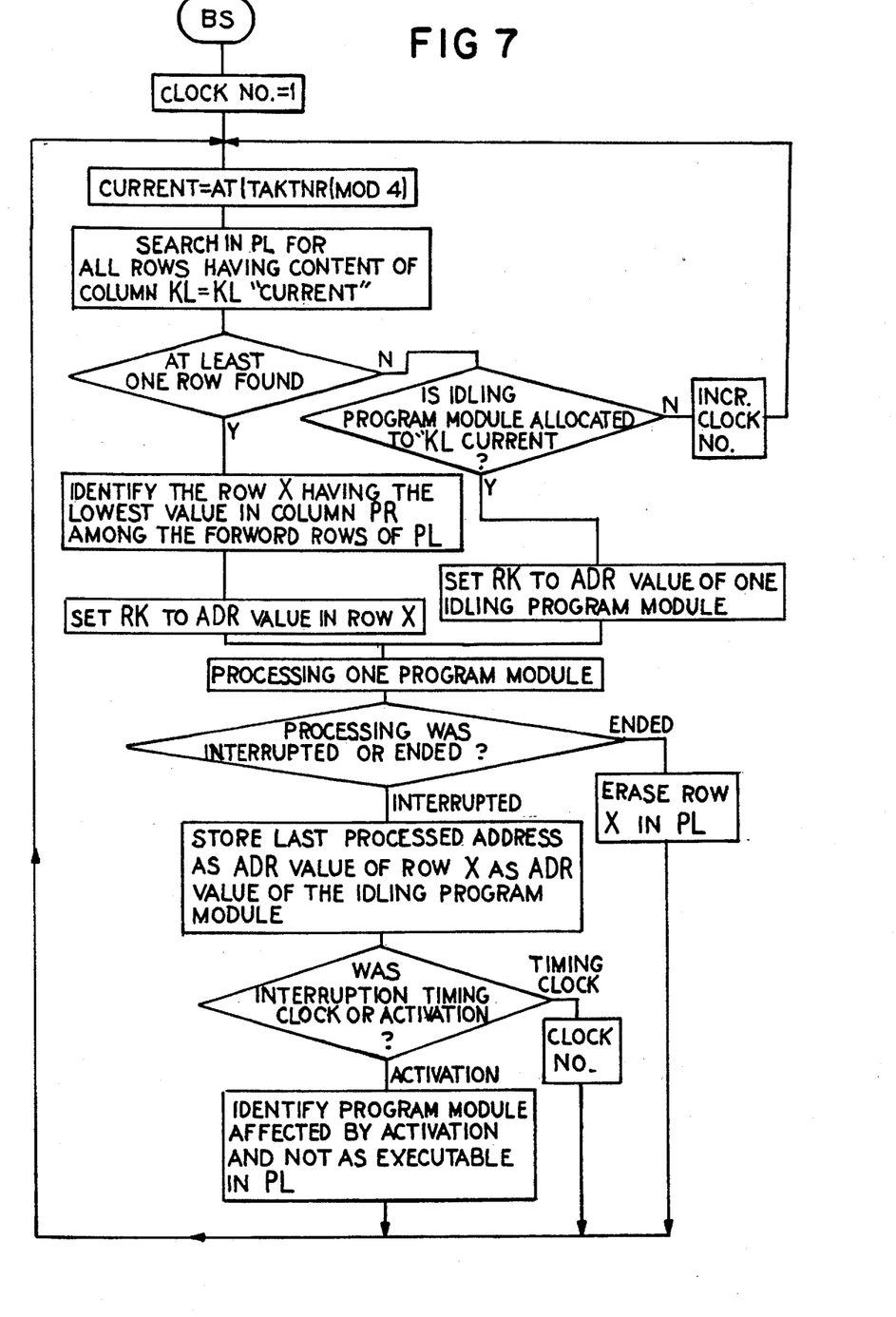
FIG. 7 is a flow chart for illustrating the essential program-oriented steps in the operating system.

FIG. 7 is a flow chart wherein the critical program-oriented steps, particularly those of the computer core allocation sequence in the operating system can be reduplicated. Proceeding on the basis of a pre-setting of a variable clock number provided for counting the timer clocks, the current program module function class is identified from the sequence table AT at the position (clock number module 4). Thus, in conjunction with the example from FIG. 5 and FIG. 6, the program module function class "B" would be selected first as the current program module function class.

After the current program module function class has been defined, those program modules that belong to the current program module function class are identified from the process list PL, the appertaining notations being deposited line-by-line in the process list below one another. When at least one program module has been found, then the program module from the program modules that have been found is selected that has the lowest PR value, i.e. the highest priority level. However, when no program module that is allocated to the current program module function class has been found, then a query occurs to see whether the idling program module is allocated to the current program module function class. When this is not the case, then the variable clock number is counted up by one, i.e. is incremented, and a new, current program module function class is identified.

In those instances when a program module allocated to the current program module function class has been identified, the computer core RK, i.e. the processor, is set to the address of the appertaining program module in the system memory SSP. For example, the address can be deposited in the column ADR of the process list PL. The processing of the identified program module subsequently occurs. In FIG. 5, for example, this would be the program module having the identification number NO "2".

The processing of this program module can be ended or interrupted. When the processing is ended, the notation belonging to this program module in the process list PL, i.e. the line X in the present example, is erased, and the allocation sequence is run through anew. When the processing has been interrupted, then the last processed address of the program module is stored as address value ADR in order to have the respective, relevant address available for a continuation of the program module. The interrupt can have occurred in the form of a periodic timing clock that is provided for the distribution of the computer capacity or it can have been triggered by some other, incoming information in the form of an activation or, respectively, interrupt. When the interruption has been produced by a periodic timing clock, then the variable clock number is incremented. When the interruption was initiated on the basis of an activation, then the program module affected by the activation is identified in the activation identification sub-system ANRS and is noted as executable in the process list PL. Subsequently, the allocation sequence is run through anew.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A program-controlled communication system having a programmable digital computer system that processes information according to instructions stored in function oriented program modules and that derives output information therefrom, said computer having a system memory in which is stored data and the program modules, and said computer having a central processing unit by which the program modules are executable, said central processing unit executing a multi-tasking operating program for controlling the central processing unit, the operating program having an activation identification program controlling the central processing unit to identify each program module which is executable in a process list, the multi-tasking operating program further having a central processing unit allocation program controlling the central processing unit to select a respective program module from the process list and execute the selected program module, comprising:

a plurality of program module function groups, each program module function group having a plurality of program modules and each program module function group of the plurality of program module function groups being associated with specifically defined functions; and the central processing unit when executing the central processing unit allocation program having first selector means for selecting program module function groups sequentially according to a sequence table programmed therein, such that each program module function group of the plurality of program module function groups is selected for a predetermined time period; and the central processing unit when executing the central processing unit allocation program having second selector means for selecting for execution in the central processing unit a program module included in the program module function group selected by the first selector means.

2. The program-controlled communication system according to claim 1, wherein the central processing unit allocation program has first switching instructions effecting said first selector means for selecting a next program module function group when no program module in the currently selected program module function group is executable.

3. The program-controlled communication system according to claim 1, further comprising a timer program module, which is executable by the central processing unit, controlling the central processing unit for processing incoming, real-time-related information; wherein said central processing unit allocation program has second switching instructions effecting said second selector means for selecting for executing said timer program module when executable immediately after the time period of a currently selected program module function group.

4. The program-controlled communication system according to claim 1, further comprising an executable idling program module, wherein the central processing unit allocation program includes third switching instructions effecting said second selector means for selecting the idling program module when no other program module is executable with respect to all program module function groups.

5. The program-controlled communication system according to claim 1, wherein said first selector means changes selection from a current program module function group to a next program module function group in response to arrival of a periodically repeating, real-time-related information.

6. The program-controlled communication system according to claim 1, wherein the program-controlled communication system is a modularly structured ISDN communication system having server units as function modules, each of the server units having a plurality of server specific program modules and wherein a respective server-representing program module function group of said plurality of program module function groups is comprised of said server specific program modules.

7. The program-controlled communication system according to claim 1, wherein the program-controlled communication system is an ISDN communication system and wherein the program modules include a transition program module that is when executed a sluice to a time-sharing operating program, and wherein one of the plurality of program module function groups is comprised only of said transition program module.

8. A program-controlled communication system, comprising:

a programmable digital computer system that processes information according to instructions stored in function oriented program modules and that derives output information therefrom, said computer having a system memory in which is stored data and the program modules, and said computer having a central processing unit by which the program modules are executable, said central processing unit executing a multi-tasking operating program for controlling the central processing unit, the operating program having an activation identification program controlling the central processing unit to identify each program module which is executable in a process list, the multi-tasking operating program further having a central processing unit allocation program controlling the central processing unit to select a respective program module from the process list and execute the selected program module;

a plurality of program module function groups, each program module function group having a plurality of program modules, and means for allocating each of the program modules to a respective program module function group based on a function of the program module; and the central processing unit when executing the central processing unit allocation program having first selector means for selecting program module function groups sequentially according to a sequence table programmed therein, such that each program module function group of the plurality of program module function groups is selected for a predetermined time period; and the central processing unit when executing the central processing unit allocation program having second selector means for selecting for execution in the central processing unit a program module included in the program module function group selected by the first selector means.

9. The program-controlled communication system according to claim 8, wherein the central processing unit allocation program has first switching instructions effecting said first selector means for selecting a next program module function group when no program module in the currently selected program module function group is executable.

10. The program-controlled communication system according to claim 8, further comprising a timer program module, which is executable by the central processing unit, controlling the central processing unit for processing incoming, real-time-related information; wherein said central processing unit allocation program has second switching instructions effecting said second selector means for selecting for executing said timer program module when executable immediately after the time period of a currently selected program module function group.

11. The program-controlled communication system according to claim 8, further comprising an executable idling program module, wherein the central processing unit allocation program includes third switching instructions effecting said second selector means for selecting the idling program module when no other program module is executable with respect to all program module function groups.

12. The program-controlled communication system according to claim 8, wherein said first selector means changes selection from a current program module function group to a next program module function group in response to arrival of a periodically repeating, real-time-related information.

13. A program-controlled communication system, comprising:

a programmable digital computer system that processes information according to instructions stored in function oriented program modules and that derives output information therefrom, said computer having a system memory in which is stored data and the program modules, and said computer having a central processing unit by which the program modules are executable, said central processing unit executing a multi-tasking operating program for controlling the central processing unit, the operating program having an activation identification program controlling the central processing unit to identify each program module which is executable in a process list, the multi-tasking operating program further having a central processing unit allocation program controlling the central processing unit to select a respective program module from the process list and execute the selected program module;

a plurality of program module function groups, each program module function group having a plurality of program modules, and means for allocating each of the program modules to a respective program module function group based on a function of the program module;

the central processing unit when executing the central processing unit allocation program having first selector means for selecting program module function groups sequentially according to a sequence table programmed therein, such that each program module function group of the plurality of program module function groups is selected for a predetermined time period; and the central processing unit when executing the central processing unit allocation program having second selector means for selecting for execution in the central processing unit a program module included in the program module function group selected by the first selector means;

the program-controlled communication system being part of a modularly structured ISDN communication system having server units as function modules, each of the server units having a plurality of server specific program modules and a respective server-representing program module function group being formed by said server specific program modules.

14. The program-controlled communication system according to claim 13, further comprising an executable idling program module, wherein the central processing unit allocation program includes third switching instructions effecting said second selector means for selecting the idling program module when no other program module is executable with respect to all program module function groups.

15. The program-controlled communication system according to claim 13, wherein the program modules include a transition program module that is when executed a sluice to a time-sharing operating program, and wherein one of the plurality of program module function groups is comprised only of said transition program module.

* * * * *